(12) United States Patent
Heppe et al.

(10) Patent No.: US 6,961,018 B2
(45) Date of Patent: Nov. 1, 2005

(54) METHOD AND APPARATUS FOR SATELLITE-BASED RELATIVE POSITIONING OF MOVING PLATFORMS

(75) Inventors: Stephen B. Heppe, Hood River, OR (US); Kristoffer Gauksheim, Mill Creek, WA (US)

(73) Assignee: The Insitu Group, Inc., Bingen, MA (US)

(*) Notice: Subject to any disclaimer, the term of this patent is extended or adjusted under 35 U.S.C. 154(b) by 0 days.

(21) Appl. No.: 10/960,637

(22) Filed: Oct. 6, 2004

(65) Prior Publication Data

US 2005/0110676 A1 May 26, 2005

Related U.S. Application Data (60) Provisional application No. 60/508,937, filed on Oct. 6, 2003.

(51) Int. Cl.[7] .................................... H04B 7/185
(52) U.S. Cl. ...................... 342/357.08; 342/357.03
(58) Field of Search ................. 342/357.02, 357.03, 342/357.06, 357.08; 701/207, 213, 215

(56) References Cited

U.S. PATENT DOCUMENTS

| | | | |
|---|---|---|---|
| 6,477,463 B2 | * | 11/2002 | Hamilton ................... 701/211 |
| 2005/0001762 A1 | * | 1/2005 | Han et al. .............. 342/357.04 |

* cited by examiner

*Primary Examiner*—Dao Phan
(74) *Attorney, Agent, or Firm*—Perkins Coie LLP (57) ABSTRACT

The present invention is directed to the determination of a relative position between moving platforms, using satellite-based navigation techniques and equipment installed on said platforms. It combines the concepts of observation-space and navigation-space differential systems, and operates a DGNSS base station in a time-varying mode, in order to rely on the built-in differential positioning and navigation capabilities of particular GNSS receivers while minimizing datalink loading and computational load in auxiliary processors. The invention achieves accurate relative positioning and navigation with respect to a moving base station, using DGNSS equipment that assumes it is stationary when operated in a reference station mode.

18 Claims, 8 Drawing Sheets

METHOD AND APPARATUS FOR SATELLITE-BASED RELATIVE POSITIONING OF MOVING PLATFORMS

CROSS-REFERENCE TO RELATED APPLICATION(S)

This application claims the benefit of U.S. Provisional Application No. 60/508,937, filed on Oct. 6, 2003, entitled "METHOD AND APPARATUS FOR SATELLITE-BASED RELATIVE POSITIONING OF MOVING PLATFORMS," which is hereby incorporated by reference.

TECHNICAL FIELD

The described technology is directed to the determination of a relative position between moving platforms using satellite-based navigation techniques and equipment installed on the platforms.

BACKGROUND

The Navstar/Global Positioning System ("GPS") comprises a constellation of satellites, control stations, and user stations (receivers) intended to support user navigation and time distribution on a world-wide basis. Each individual satellite transmits precisely-timed ranging signals as well as its ephemeris data that describes its own trajectory through space as a function of time. A user station can determine its own position and clock offset, relative to GPS system time, by tracking the signals from multiple satellites, determining so-called "pseudoranges" to these satellites, demodulating the data transmitted by these satellites, and solving for its own position and clock offset given the pseudoranges and satellite ephemeris data. The clock offset relative to Universal Coordinated Time can be determined by applying an additional offset parameter which is transmitted by the satellites. User station velocity can be determined by differentiating position estimates over time, or by direct calculation from Doppler measurements on the satellite downlink signals. The Doppler measurements may be based on ranging codes transmitted as a pseudo-random sequence transmitted on a carrier signal. The GPS is maintained and operated by the United States of America. The GLONASS system, maintained and operated by the Russian Federation, is similar in many respects to GPS.

The Global Navigation Satellite System (GNSS) is a loosely-defined super-set of systems, including GPS, GLONASS, and other existing and planned systems, intended to support navigation and time distribution.

The GPS, GLONASS, and GNSS systems are typically subject to a combination of impairments which limit the accuracy of user navigation. These include slowly-varying impairments such as reporting errors in the satellite ephemeris, satellite clock drift, and atmospheric propagation factors, and rapidly-varying impairments such as receiver measurement noise. The slowly-varying impairments tend to be common to a group of stations operating in a local area (10 s or 100 s of miles in extent). These slowly-varying impairments can be estimated by a "base station" at a surveyed location and transmitted to user stations at non-surveyed locations (or in motion), allowing the associated errors experienced by the user stations to be reduced. Such cooperative systems are typically called "differential systems," and can be referred by various names such as DGPS and DGNSS. There are a wide variety of differential systems incorporating a variety of techniques.

In one type of differential system, the base station calculates an expected range to each satellite (at an instant of time) based on its surveyed location and the ephemeris data for each satellite. The base station compares this expected range to a measured range (based on the ranging codes sent by a satellite) at the same instant of time. The difference contains the slowly-varying impairments as well as the rapidly-varying impairments. The difference is reported to the user station(s) over a datalink (possibly along with other information). The difference is then applied at the user station to correct its own pseudorange observations of the satellites prior to calculating its position and clock offset. This type of differential system is sometimes called a "corrected-differential," "range-domain," or "observation-domain" system since it transfers corrections associated with the range or pseudorange observations made at the various stations. The required data rate of the datalink is typically dictated, in large measure, by the need to transfer a separate observation or set of observations for each of several satellites at a specified rate or set of rates. The number of satellites typically varies from 4 to 12 (although more satellites could be reported in the future as additional satellite constellations are deployed and integrated into the GNSS). The observations might typically include, as an example, the arrival time differences (i.e., observed minus expected arrival times), or the equivalent in range offset, for each of the ranging codes transmitted by the satellites in view of the base station. In addition, the observations can include the integrated carrier phases of the carrier signals upon which the ranging codes are modulated, or other information relating to carrier phase measurements and observations. A DGNSS system that transmits and uses information based on carrier phase measurements, in order to improve user station positioning and navigation performance in real time, is typically referred as a real-time kinematic (RTK) system. RTK systems offer substantially better navigation performance (lower navigation and position errors) than non-RTK systems because of a higher frequency, but as a result of the higher frequency typically involve substantially higher data rates, longer initialization times, greater computational burdens on the part of the user station (either within the GNSS receiver or an external processor), and a smaller maximum achievable separation distance between a base station and rover.

Several internationally-recognized standards exist for various types of differential systems (e.g., RTCM SC-104, RTCA DO-217, RTCA DO-229). These standards describe, among other things, the datalink message formats used to transfer information. Several manufacturers of GNSS equipment have developed their own proprietary standards for implementing differential GNSS systems. These standards typically employ observation-domain techniques.

In another type of differential system, the base station determines its position based on the observations it can make (and the ephemeris data) and compares this position to its surveyed position. The difference between the computed and surveyed positions is reported to the user station(s) over a datalink (possibly along with other information intended to add features to the differential system). A user station calculates its own position based on the observations it can make (and the ephemeris data) and corrects this position with the difference reported by the base station. This type of differential system is sometimes called a "differenced-differential," "position-domain," "navigation-domain," or "solution-domain" system since it transfers corrections associated with the 3D navigation solution generated by a typical GNSS receiver. The required data rate of the datalink is typically dictated, in large measure, by the need to transfer a 3D position of the base station (the reference station) at a specified rate. Since there are only three values transferred at high rate (e.g., the computed offset of the base station from its surveyed location in an Earth-centered, Earth-fixed coordinate frame), this type of differential system typically requires a lower data rate than an "observation-domain" system. However, good performance is typically obtained only if the base station and user station rely on the same set of satellites to compute their respective locations. When different sets of satellites are relied-upon, then the difference calculated by the base station may reflect a significant contribution by a satellite not relied upon by the user station or may fail to reflect a significant contribution by a satellite only relied-upon by the user station. Thus, the difference calculated by the base station may not accurately reflect the actual difference of the user station. A well-designed navigation-domain differential system can achieve roughly the same level of performance as a non-RTK observation-domain system. There is, however, no equivalent of RTK performance in navigation-domain differential systems (although the individual stations can smooth-out their navigation solutions using carrier phase tracking techniques). It is also possible for two user stations in an RTK differential system to exchange information regarding their navigation-domain positions or trajectories, in order to develop an accurate relative baseline between them. However, this is not a navigation-domain differential system; it is merely an exchange of positioning data.

Many commercially-available GNSS receivers have the ability to either generate differential correction data and observations (under certain operational constraints and given certain data, such as a surveyed location), or apply differential correction data in order to determine a relative position or a differentially-corrected absolute position, or both. However, many commercially-available GNSS receivers, able to generate or apply differential correction data and observations, have distinct and disjoint modes of operation: In one mode that assumes a fixed or non-moving dynamic at a specified location (e.g., a "reference station" mode), they can generate differential correction data and observations. In another mode (e.g., a "rover mode" that allows movement), they can apply differential corrections and observation data to generate a relative baseline and/or a differentially-corrected absolute position.

Most DGNSS systems rely on a fixed base station. Some commercially-available GNSS receivers can be operated as a component of a differential base station while they are in motion, without declaring a surveyed location. However, many commercially-available GNSS receivers, when configured to operate as a component of a differential base station, assume that the receiver is at a fixed position relative to the Earth. Such a receiver may require that a survey position be specified before it will act as a base station, and may then report zero velocity (relative to the Earth) even if it is moving. Such a receiver may also fail to operate correctly if it is moving, generating integrity alarms or false data (which may introduce errors at the user stations) if the position offset from its surveyed location, or its velocity, exceed certain limits.

In some cases it is necessary to determine the relative position of two stations that are in motion (or could be in motion), or for which no surveyed location is available for either station. The relative position of two stations is sometimes referred as the "baseline" between them. In such cases, the observations made at the two stations (or the positions calculated from such observations) can be compared to determine a relative position or baseline. This data can be extracted from typical GNSS receivers operated in a "rover mode," regardless of the receivers' operational role in a larger system. The distinction between a base station and a rover station is less clear in such cases, although it may be possible to differentiate based on operational considerations.

In some cases, it is desired to determine a relative position (a baseline) between two platforms that could be moving with respect to the Earth, using GNSS receivers mounted on the platforms, where the GNSS receivers employed cannot effectively operate in a base station mode (e.g., as a "reference station") if they are moving. This can be achieved by operating both GNSS receivers as rovers, collecting observation data and other data such as ephemeris data from the two receivers, bringing the observation data and other data to a common location (for example, one of the platforms supporting one of the two receivers), and calculating the relative position or baseline in a separate computer. However, this requires the development of appropriate datalink protocols and algorithms and the availability of a separate computer with sufficient computational ability to perform the necessary calculations in the required timeframe.

It would be desirable to determine a relative baseline between two platforms that are moving with respect to the Earth, using GNSS equipment that assumes it is stationary when operated in a reference station mode, and while minimizing the computational burden of associated computer resources.

It would further be desirable to minimize datalink loading for a given level of performance (navigation or position error) associated with the computed relative position or baseline, by combining the concepts of "observation-domain" and "navigation-domain" differential systems.

DETAILED DESCRIPTION

A method and system for calculating a baseline between a moving base station and a rover station based on both observation-domain and navigation-domain data is provided. In one embodiment, the base station generates navigation-domain data such as position and velocity at a high rate (e.g., 10 Hz) and observation-domain data such as pseudorange and carrier observations for each satellite at a lower rate (e.g., 1 Hz). The base station transmits to the rover station the navigation-domain information at the high rate and the observation-domain data at the low rate. Each navigation-domain update typically requires less data transfer (fewer data bits) than each observation-domain update. The rover station uses the observation-domain data to calculate its relative position with respect to the base station to a high degree of accuracy (e.g., using RTK techniques). The rover station can update its relative baseline based on the navigation-domain information sent by the base station at high rate (e.g., velocity and possibly higher derivatives of position) and its own calculated changes in position. The updating may be accurate over short time spans, although the updates based on navigation-domain data involve an integration error that grows over time. The error is substantially eliminated each time the relative baseline is recalculated from the observation-domain data. Thus, the system uses a highly accurate technique to establish the baseline at a low rate and uses a different technique, suitable for short spans of time, to make updates to the established baseline at a high rate. In this way, the system provides a highly accurate baseline with a relatively low bandwidth.

The described technology combines the concepts of observation-space and navigation-space differential systems, and operates a DGNSS base station in a time-varying mode, in order to rely on the built-in differential positioning and navigation capabilities of particular GNSS receivers while minimizing datalink loading and computational load in auxiliary processors.

Figure 1:
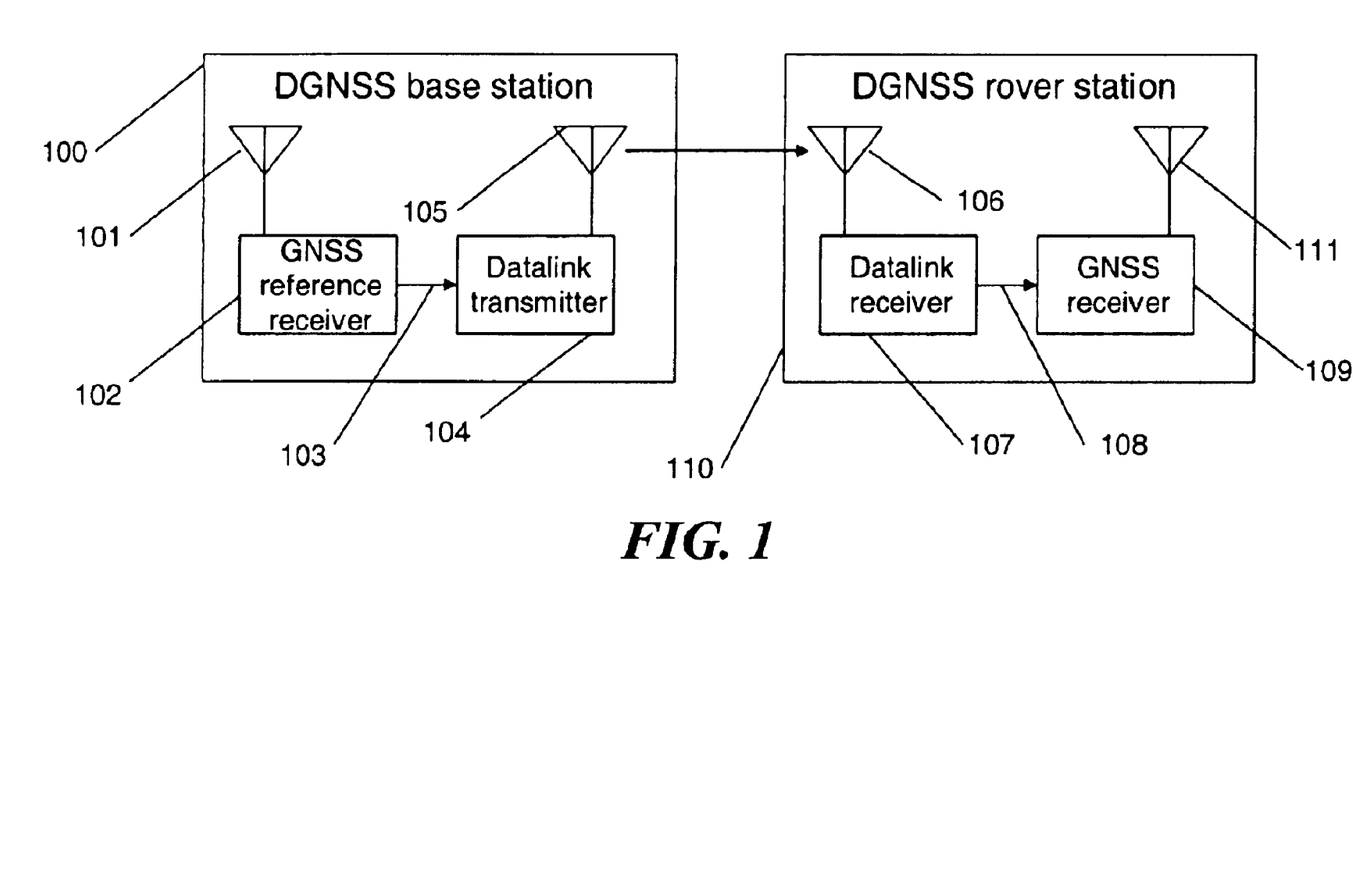
FIG. 1 illustrates a DGNSS base station and a DGNSS rover station.

FIG. 1 illustrates a GNSS base station 100 operating as a reference station in a differential GNSS ("DGNSS") system, and a GNSS rover station or user station 110 operating in the same DGNSS system. The GNSS base station 100 comprises an antenna 101 designed to receive GNSS signals, a GNSS receiver 102 configured to act as a reference station in a differential GNSS system, a data interface 103, a datalink transmitter 104, and an antenna 105 designed to support the transmission of datalink signals. The antenna 101 is connected to the GNSS receiver 102, which processes the received GNSS signals and generates DGNSS data that is passed over the data interface 103 to the datalink transmitter 104. DGNSS data passed from the base station to the rover station can include corrections or observations, or both, and can include other data such as base station (reference station) position and health. The datalink transmitter generates RF signals modulated with the differential correction data and observations, which are radiated by the antenna 105. The RF signals propagate through space and are received by the GNSS rover station 110 comprising a datalink antenna 106, datalink receiver 107, data interface 108, GNSS receiver 109, and associated antenna 111. Specifically, the RF signals are received by the antenna 106 associated with the datalink receiver 107. The RF signals are demodulated by the datalink receiver and passed over a data interface 108 to the GNSS receiver 109 configured to act as a rover in the DGNSS system. The GNSS receiver 109 also receives GNSS signals via its associated antenna 111, and uses the information received from the datalink to correct the measurements it makes on the incoming GNSS signals. The corrected measurements are then used by the GNSS receiver to form high-accuracy navigation and position estimates which can be delivered to an external user system or display (not shown). One skilled in the art will appreciate that many variations on this basic system are possible.

Figure 2:
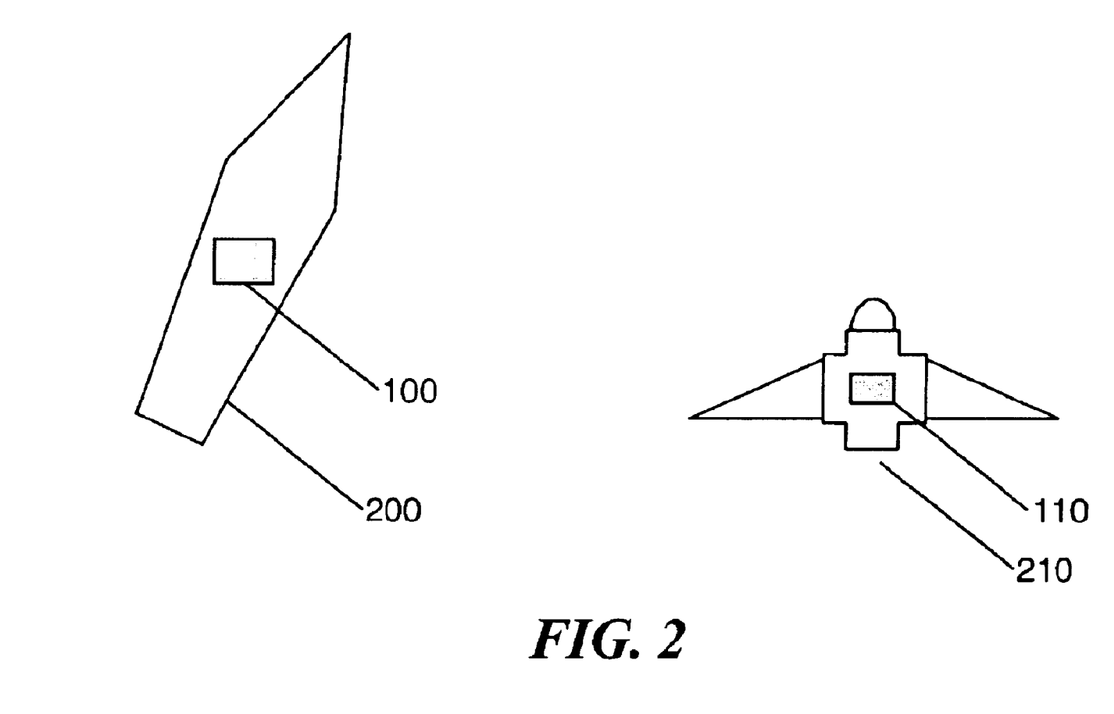
FIG. 2 illustrates a moving DGNSS base station and a moving DGNSS rover station.

FIG. 2 illustrates a GNSS base station 100 on a moving platform 200 and a GNSS rover station or user station 110 associated with a user platform 210. In this figure, the base station is on a ship and the rover station is on an aircraft. One possible application of the described technology is to allow precise relative navigation between the ship (actually the GNSS antenna associated with the GNSS reference station on the ship) and the aircraft (actually the GNSS antenna associated with the GNSS rover station on the aircraft).

Figure 3:
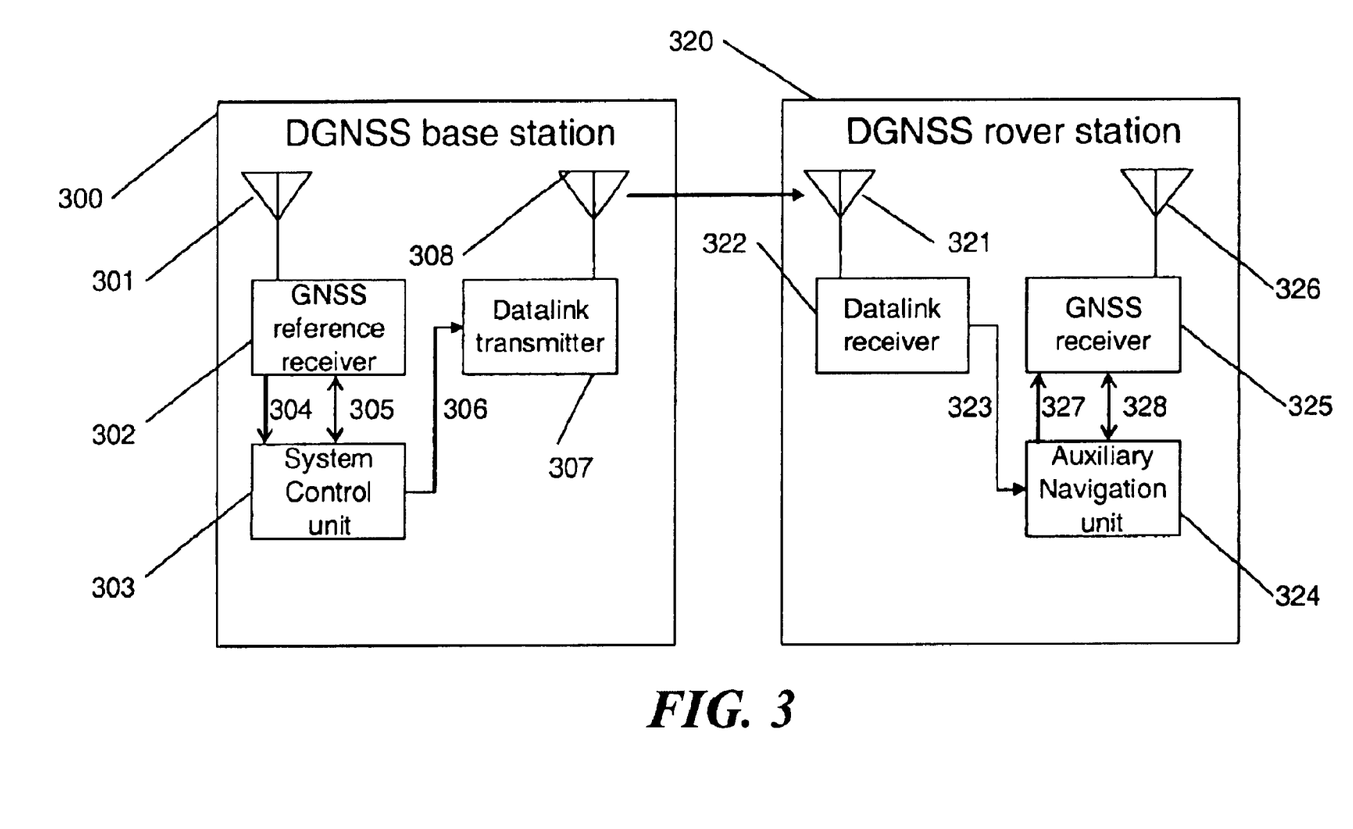
FIG. 3 illustrates a DGNSS base station and a DGNSS rover station.

FIG. 3 illustrates a GNSS base station 300 and a GNSS rover station 320 according to one embodiment. The GNSS base station comprises an antenna 301 designed to receive GNSS signals, a GNSS receiver 302 that can be configured to act as a reference station in a differential GNSS system, a system control unit 303 which communicates with the GNSS receiver 302 via a uni-directional data interface 304 and a bidirectional data interface 305, a datalink transmitter 307 which receives data from the system control unit 303 via unidirectional interface 306, and an antenna 308, connected to the datalink transmitter 307, which is designed to support the transmission of datalink signals. The GNSS rover station 320 comprises a datalink receiving antenna 321 connected to a datalink receiver 322, an auxiliary navigation unit 324 which receives data from the datalink receiver via data interface 323, a GNSS receiver 325 able to operate as a rover in a DGNSS system, which communicates with the auxiliary navigation unit via unidirectional interface 327 and bidirectional interface 328, and a GNSS antenna 326 which is connected to the GNSS receiver for the purpose of providing GNSS signals.

In one embodiment, the base station GNSS receiver 302 generates observation-domain DGNSS data at a relatively low rate (e.g., 1 Hz or slower) and navigation-domain data at a relatively higher rate (e.g., 10 Hz). Preferably, the GNSS receiver should be selected or designed to support these observation types including velocity measurements based on carrier-phase observations (although possible future improvements in GNSS technology could allow sufficient velocity accuracy without using carrier-phase measurements).

The observation-domain DGNSS data is transferred to the system control unit 303 via data interface 304, and the system control unit passes the data to the datalink transmitter 307 over data interface 306, so that the data can be transmitted on a datalink accessible by the rover(s) to support RTK operation with high-accuracy relative baselines calculated at the rover station(s). The system control unit may reformat this data prior to passing it to the datalink transmitter, or simply pass along the data as formatted by the GNSS receiver. Many techniques for transmitting data are known in the art and can be used with the described technology. It is also possible to pass data from the GNSS receiver to the datalink transmitter bypassing the system control unit, e.g., via a bus, although this would require a different set of interfaces than those shown in FIG. 3.

The navigation-domain data includes point position solutions and velocities and may also include higher-order derivatives (acceleration) . The navigation-domain data is also transmitted on the datalink, with at least the velocity data transmitted at the relatively higher rate.

A typical GNSS receiver may need to be placed in a particular operating mode (e.g., a "base station" or "reference receiver" mode) in order to generate the observation-domain DGNSS data, and if it is moving, it may be incapable of generating accurate navigation-domain data while in said particular operating mode. Furthermore, sufficient displacement in position could cause a typical GNSS receiver to generate false observation-domain data or otherwise impair overall system performance. In this case, the system control unit 303 can command the GNSS receiver to cycle between two suitable operating modes, such as a reference receiver mode and a rover mode, the commands being delivered via bi-directional interface 305. An example operating regime is to command the GNSS receiver to operate as a rover receiver for approximately the first 900 msec of every integer GPS (or UTC) second, and as a reference receiver for approximately the last 100 msec of every second, with the command timing arranged so that the receiver can generate observation-domain DGNSS data at the start of each integer second. Generating the observation-domain data at the start of an integer second is convenient given the typical operating behavior of many currently-available GNSS receivers. This constraint could be relaxed depending on the capabilities of the particular GNSS receivers used. For the approximately 900 msec of each second that the receiver is acting as a rover, it can generate accurate navigation-domain position and e.g. velocity data. At the end of each such time interval, the latest navigation-domain position data received by the system control unit 303 is used to formulate an appropriate command or commands placing the GNSS receiver 302 into a reference receiver mode, with a surveyed position equal to the navigation-domain position data received by the system control unit 303. In a typical application such as a ship-borne base station per FIG. 2, the position offsets over the individual 100 msec intervals, in which the GNSS receiver operates as a reference station, are small enough to allow effective operation of the GNSS receiver as a reference station.

In one embodiment the system control unit 303 provides a merged stream of messages to the datalink transmitter 307 via data interface 306, the merged stream of messages contains as a minimum the observation-domain DGNSS data and the navigation-domain position and velocity data. If the navigation-domain data generated by the GNSS receiver is inaccurate when the receiver is operating in a reference station mode, the system control unit can choose to not transmit these data on the uplink. However, even if this data is transmitted, appropriate annotation of the data in the uplink message format, and programming in the auxiliary navigation unit of the rover station(s) can be applied to reject undesired or inaccurate data.

A rover station 320, which is also making observations with a GNSS receiver 325 and appropriate antenna 326, receives the uplink data transmitted by the base station with datalink antenna 321 and datalink receiver 322. The messages containing the uplink data are delivered to the auxiliary navigation unit 324 over unidirectional data interface 323, which passes the observation-domain DGNSS data to the GNSS receiver 325 (possibly reformatting the messages as required to match the input format expected by the GNSS receiver) over unidirectional data interface 327. It is also possible to pass data from the datalink receiver to the GNSS receiver, bypassing the auxiliary navigation unit, such as via a bus, although this would require a different set of interfaces than those shown in FIG. 3. In a typical system, these messages might include carrier-phase observations and the most-recently specified survey position of the reference station (although other messages may be transmitted as well). Given this data and its own GNSS observations, the GNSS receiver 325 forms a solution for the relative baseline to the reference station and reports this relative baseline to the auxiliary navigation unit over bidirectional data interface 328. The auxiliary navigation unit can learn the survey position of the reference station either from the uplink messages or from the local GNSS receiver itself, and derive the relative baseline by subtracting the reported reference station survey position from the absolute position fix received from the GNSS receiver. This solution can be updated at low rate (e.g., 1 Hz equal to the rate at which new uplink DGNSS data are provided to the rover).

In one embodiment, this solution is calculated in the GNSS receiver on the rover platform thereby avoiding the need to perform RTK processing in an auxiliary processor such as the auxiliary navigation unit. In another embodiment, this solution is calculated in an auxiliary processor given the uplinked DGNSS data and the local observations of the GNSS receiver 325.

The GNSS receiver 325 also reports its velocity over time to the auxiliary navigation unit 324 via bidirectional data interface 328. The auxiliary navigation unit 324 may need to issue certain commands to the DGNSS receiver 325 in order to initiate and maintain this data stream. Hence, the data interface 328 is bidirectional in one embodiment. The auxiliary navigation unit receives data regarding the velocity of the base station over time via the datalink antenna 321, datalink receiver 322, and unidirectional interface 323. The auxiliary navigation unit uses these navigation-domain data to forward-propagate the relative baseline. This is achieved with substantially lower data link loading than if a full set of carrier-phase observations are uplinked at high rate, as would be required to form a new RTK solution at high rate without making assumptions as to base station dynamics. A position error accumulates slowly over time, due to integrated measurement noise and other factors, but is substantially eliminated each time a new relative baseline is calculated from the observation-space carrier-phase measurements (e.g., at 1 Hz given the description above, assuming all uplink messages are delivered without error).

The auxiliary navigation unit can maintain a track of the base station absolute position comprising the base station's current position and velocity (and possibly historical data). For example, the current velocity data received from the uplink allows the auxiliary navigation unit to forward-propagate the base station's reported point position estimate for short periods of time. Each point position estimate, received by the auxiliary navigation unit, allows said auxiliary navigation unit to update its estimate of the base station's absolute position and eliminate the accumulated position error associated with integration of measurement noise and other factors.

The uplink message stream comprising navigation-domain data need not be uniformly spaced in time (although uniform spacing is considered a desirable operating condition). Gaps in the uplink message stream can occur e.g., due to mode transitions of the base station and message losses in the communications path.

If required to do so, the auxiliary navigation unit can forward-propagate the base station position given the received velocity data (last received data or last received data and earlier data).

After receiving a new message with new navigation-domain data from the base station, the auxiliary navigation unit can use various algorithms, well known to those skilled in the art, to determine a current estimate for base station absolute position. For example, the algorithm can comprise a calculation of a new position offset based on the reported velocity applied over the time interval since the prior message received, or more elaborate techniques.

The rover absolute position can be estimated (by the auxiliary navigation unit) by adding the current relative baseline estimate to the current base station absolute position estimate.

The base station absolute positions can be delivered to the auxiliary navigation unit in the rover in several ways using the preferred embodiment. First, the base station absolute position (e.g., determined at the end of a 900 msec interval when the base station GNSS receiver is operated in a rover mode) can be reported by the GNSS receiver 302 over bidirectional interface 305 to the system control unit 303, formatted into an appropriate message, and delivered to the datalink transmitter 307 over data interface 306, which modulates the information onto an RF signal that is radiated by antenna 308. The rover then receives the RF signal with antenna 321 and datalink receiver 322, which delivers the information to the auxiliary navigation unit 324. Alternatively, the base station absolute position, as known to the GNSS receiver 302 operating in a reference station mode, can be formatted by the GNSS receiver as part of the uplink DGNSS data, thereby delivered to the system control unit via unidirectional interface 304, delivered to the datalink transmitter 307 over data interface 306, which modulates the information onto an RF signal which is radiated by antenna 308. The rover then receives the RF signal with antenna 321 and datalink receiver 322, which delivers the information to the auxiliary navigation unit 324, which passes the information to the GNSS receiver 325. The auxiliary navigation unit can either read the message directly, in addition to delivering it to the GNSS receiver, or it can poll the GNSS receiver to extract this information (the choice will depend on the capabilities of the GNSS receiver and the desires of the system implementer or system operator).

The system operator can tailor the transmission rate of uplink messages to ensure acceptably low error growth in the various position estimates, acceptably low probability of a long gap in update of absolute positions, and acceptably low probability that an arbitrary rover will lose lock and be forced to re-initialize its RTK solution. One candidate message generation regime is illustrated in Table 1 below. The rates for a particular system will depend on datalink message delivery probability, platform dynamics, user requirements regarding solution availability and reliability (continuity), and details of the GNSS receivers. Although messages can be combined, maintaining separate messages may yield greater flexibility in terms of datalink operation and can lead to lower overall datalink loading.

TABLE 1

Candidate message generation and transmission regime

| Message type | Rate (Hz) | Comments |
| --- | --- | --- |
| Observation-domain data (DGNSS data) | 1 Hz | May comprise multiple messages. In aggregate, this data stream contains all information needed for a rover GNSS receiver to calculate a relative baseline. |
| Navigation-domain velocity data | 10 Hz | |
| Navigation-domain position data | 0.5 Hz | |

One skilled in the art will appreciate that there are many suitable variations of the apparatus illustrated in FIG. 3. For example, bidirectional interfaces can be substituted for the illustrated unidirectional interfaces, or dual unidirectional interfaces can be substituted for the illustrated bidirectional interfaces. All data exchanges between e.g., GNSS receiver 302 and system control unit 303, or GNSS receiver 325 and auxiliary navigation unit 324, could be supported via single bi-directional interfaces or data buses such as Ethernet, instead of mixes of bidirectional and uni-directional interfaces. System monitors or displays can be added to provide for monitoring by human operators and display of navigation data. Additional input devices can be added to allow for modification of system operating parameters and input of survey data. Multiple data links could be used instead of the single data link illustrated. The data link can be bi-directional to allow data flow from the rover to the base station (for example the navigation data generated at the rover), and if the RF data link and other interfacing allows data flow from the rover to the base station, the navigation processing supported by the auxiliary navigation unit in a preferred embodiment, could be supported instead at the base station.

Figure 4:
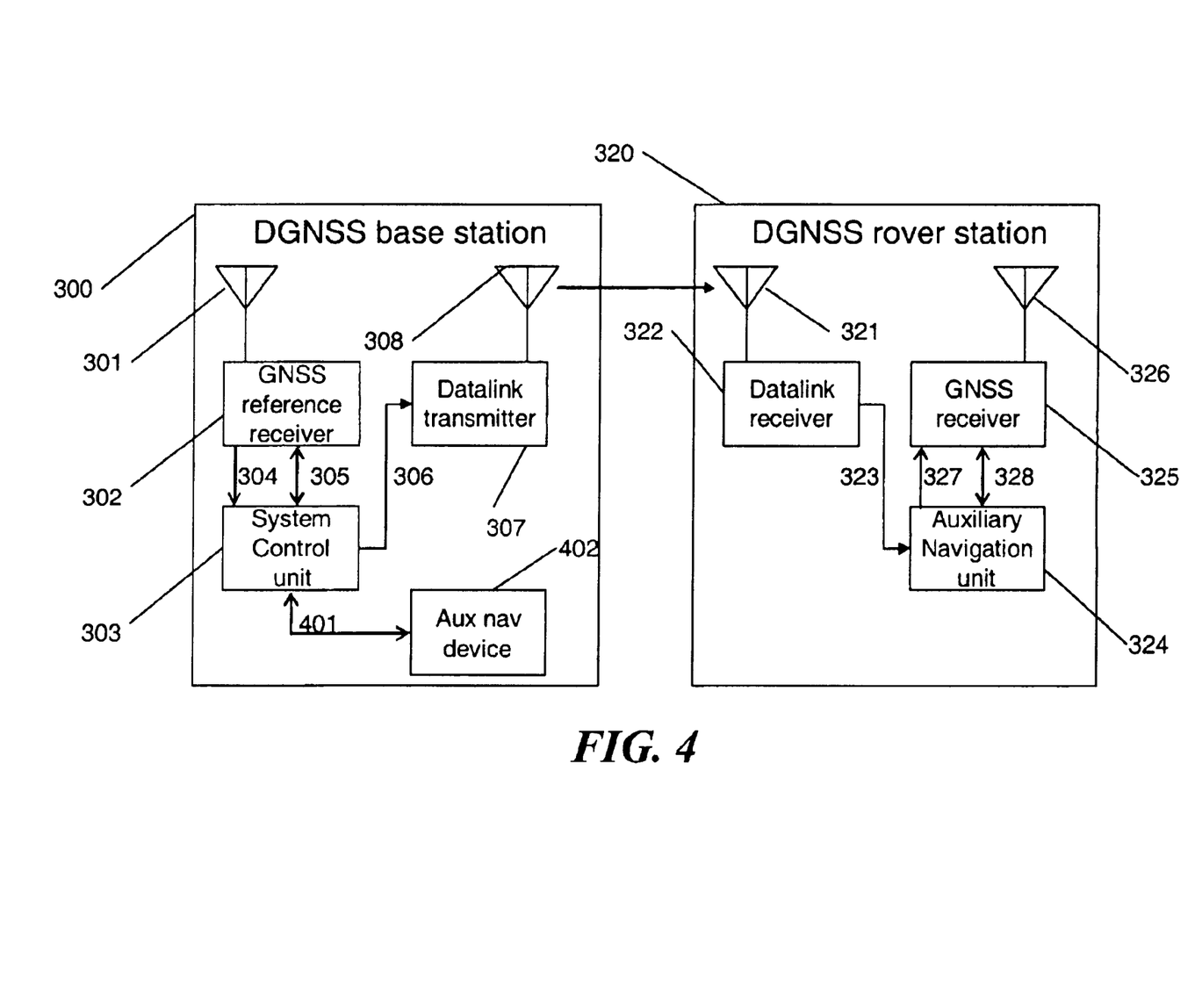
FIG. 4 illustrates another type of DGNSS base station and a DGNSS rover station.

FIG. 4 illustrates an embodiment of the described technology in which the base station absolute position, velocity data, or both, are generated by an auxiliary navigation sensor 402 that communicates with the system control unit 303 via bidirectional interface 401. The auxiliary navigation sensor may be a second GNSS receiver, an inertial navigation system, an inertial measurement unit, and so on. If the auxiliary navigation sensor provides position data, the system control unit can use these data to reset the surveyed position of the GNSS receiver 302. If the auxiliary navigation sensor provides velocity data, the system control unit can rely on the auxiliary navigation sensor instead of the GNSS receiver 302 for these data (uplinking, through the datalink transmitter, the velocity information from the auxiliary navigation sensor 402 instead of the velocity information from the GNSS receiver 302). If the auxiliary navigation sensor provides both position and velocity data, a GNSS receiver 302, that cannot provide accurate velocity data while in a reference station mode, can be left in a reference station mode (although depending on the specific characteristics of the GNSS receiver, it may need to have its survey position periodically reset with the position data).

It is possible for the GNSS receiver 302 and auxiliary navigation sensor 402 to operate cooperatively, for example if the GNSS receiver 302 provides information used to train an inertial navigation system or inertial measurement unit. In this case the training data can flow through the system control unit or directly from the GNSS receiver to the auxiliary navigation sensor (this interface possibility is not shown in FIG. 4).

Figure 5A:
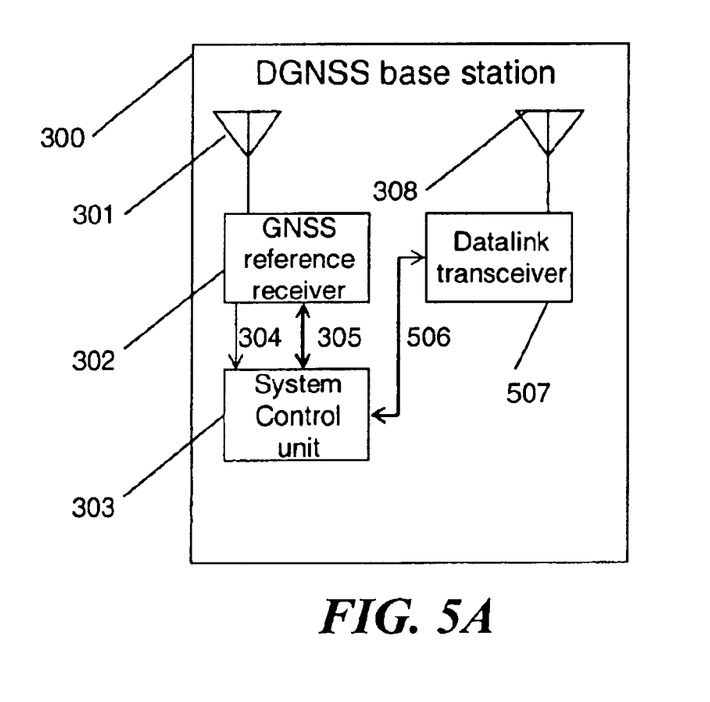
FIG. 5 illustrates two other types of DGNSS base station.
Figure 5B:
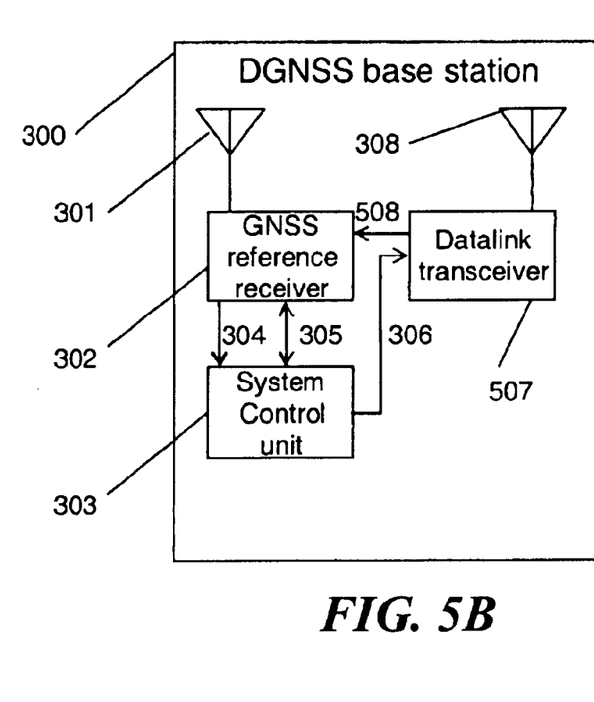

It is possible for the base station to itself use a differential GNSS system to refine its position and/or velocity estimates. For example, the GNSS receiver 302 could be WAAS-capable, relying on satellite downlink signals generated by the aviation-quality DGNSS system and received in the same band as the navigation signals of GPS. Alternatively, a different DGNSS system could share the datalink system of the invention as illustrated in FIG. 5a or 5b. In the embodiment of FIG. 5a, a datalink transceiver 507 operating through a suitable antenna 308 both receives DGNSS data (RF signals not shown), and transmits the base station's uplink data as needed to meet the desired functionality. Incoming DGNSS data is transferred to the system control unit 303 over bidirectional interface 506, where it can either:

a) be transferred to the GNSS receiver 302 over the bidirectional interface 305 or a dedicated interface (not shown) (Many currently-available GNSS receivers are incapable of processing such DGNSS input data, to form a precise position and velocity solution, while also acting as a reference station. However, in principle it is feasible to build a GNSS receiver that can both accept and generate DGNSS data at the same time.); or     b) be used in the system control unit 303 to form a differentially-corrected position and velocity estimate using GNSS observations reported to the system control unit by the GNSS receiver 302 via bidirectional interface 305.

Alternatively, incoming DGNSS data can be transferred directly to the GNSS receiver 302 via unidirectional interface 508 as illustrated in FIG. 5b.

A dedicated datalink receiver can also be used to receive DGNSS data and deliver it directly to the GNSS receiver.

Figure 6A:
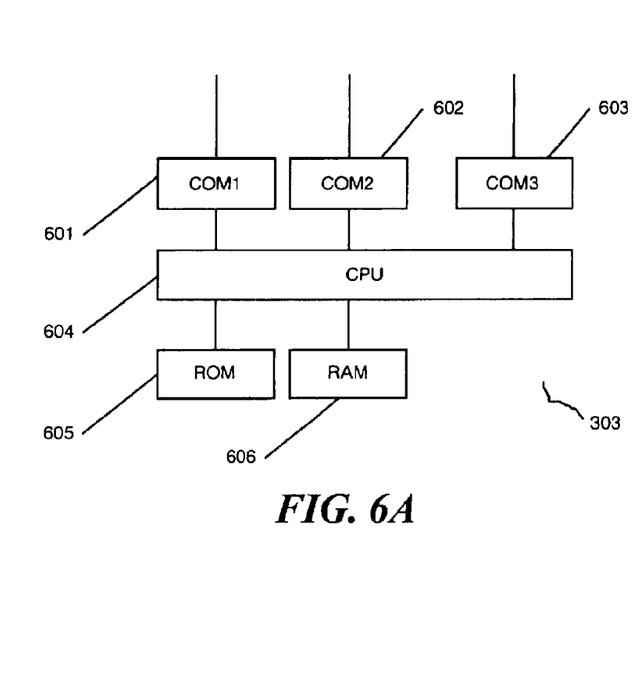
FIG. 6 illustrates simplified diagram of a system control unit associated with a DGNSS base station.

The system control unit 303 can be a single-board computer, laptop, or other data processing and routing device. Key features are illustrated in FIG. 6a which shows an embodiment tailored to the overall system design illustrated previously in FIG. 3 (other embodiments would involve minor changes as one skilled in the art would appreciate). Referring to FIG. 6a, system control unit 303 comprises three COM ports 601, 602 and 603 connected to a CPU 604, which operates in conjunction with a read-only memory 605 and a random-access memory 606. Other supporting circuitry is known to those skilled in the art, and is not shown in FIG. 6a. The COM1 port 601 provides an input interface for DGNSS data, received from the GNSS receiver 302 over data interface 304, and intended for uplink transmission to rover station(s) operating in conjunction with the base station according to the present invention. The COM2 port 602 provides bidirectional communications between the system control unit and the GNSS receiver 302 over data interface 305, typically for GNSS receiver control, GNSS receiver status monitoring, and reception of position and velocity estimates from the GNSS receiver. For some GNSS receivers, the functions of COM1 and COM2 can be merged into a single bidirectional interface. The COM3 port 603 supports data transfer to the datalink transmitter 307 over data interface 306. The ROM 605 provides for stored-program control, while the RAM 606 provides for real-time data storage.

Figure 7:
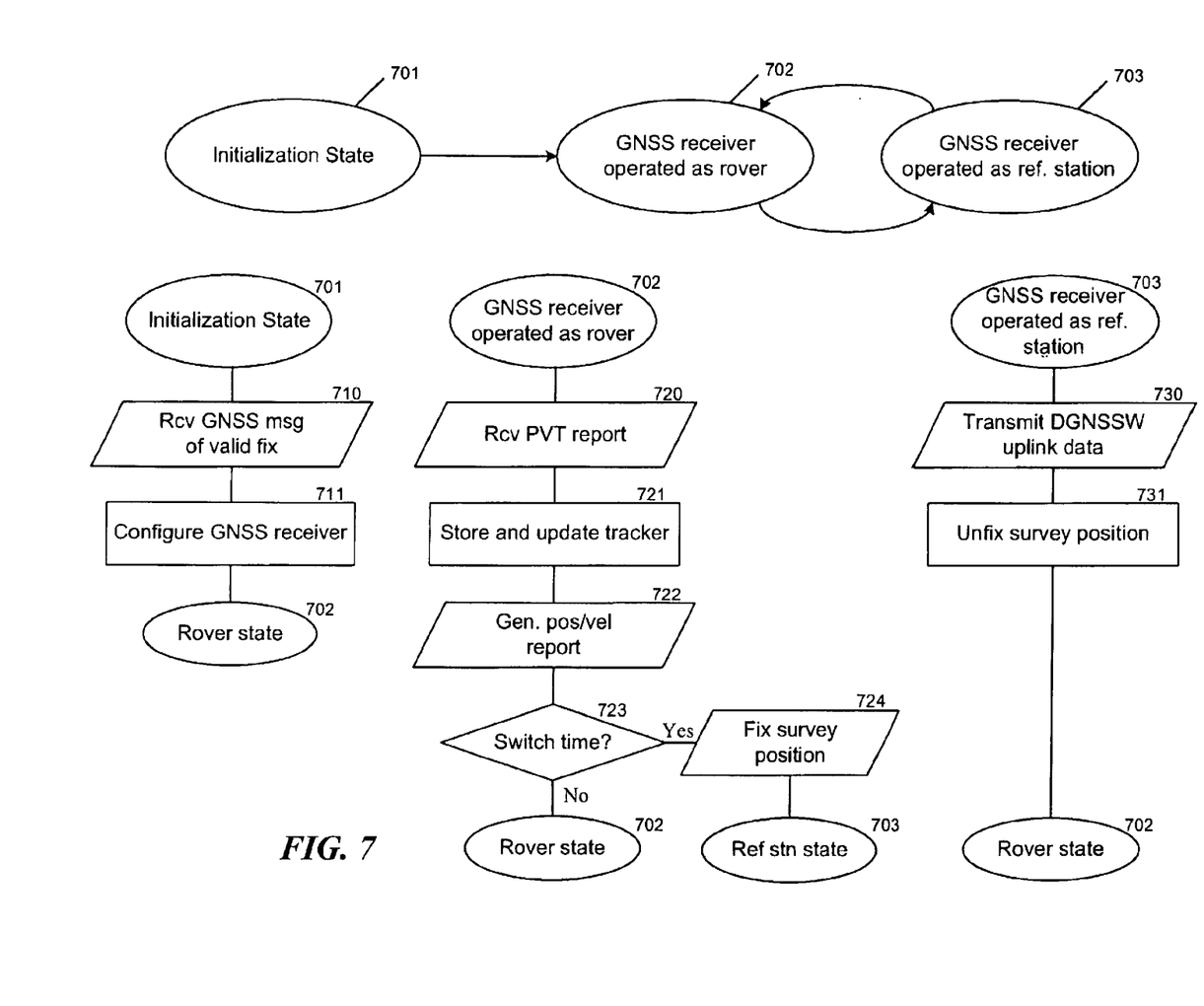
FIG. 7 illustrates a sequence of operating modes and operations associated with a DGNSS base station.

The CPU 604 provides for the cyclic control of the GNSS receiver according to the processing flow illustrated in FIG. 7. There are three primary operating states for the base station (mode control exercised by the CPU): initialization state, rover operating state, and reference station operating state. (There may also be a fault state which is not shown.) Upon power up, the CPU enters an initialization state 701 in which it waits for a valid message from the GNSS receiver indicating an initial position fix. This assumes that the GNSS receiver will generate a valid position fix of its own volition. If the GNSS receiver needs to be configured/commanded by the CPU to generate a first position fix, the process flow of FIG. 7 can be modified as required as those skilled in the art will appreciate. Upon receiving this message 710, the CPU issues the necessary commands 711 to the GNSS receiver to configure it for generating position, velocity, and time outputs at the desired rate (when operating in rover mode), and DGNSS data messages when operating in a reference station mode. The base station (CPU) then transitions to the rover operating state 702. (It is possible for the base station (CPU) to transition from the initialization state to the reference station operating state 703 instead of the rover operating state 702.) For example, in the case of a NovAtel OEM4-G2L receiver, with the NovAtel receiver's COM1 port connected to data interface 305 and its COM2 port connected to a unidirectional data interface 304, the CPU would issue commands over data interface 305 such as:

INTERFACEMODE COM2 NONE RTCA
LOG COM2 RTCAOBS ONTIME 1
LOG COM2 RTCAREF ONTIME 1
LOG BESTXYZ ONTIME 0.1

These commands setup the interface mode for DGNSS data that will be issued on the GNSS receiver's COM2 port for delivery to the remote rovers, using the RTCA protocol at the start of each second, and also command logging of XYZ position and velocity at a relatively higher rate on the GNSS receiver's COM1 port. Latitude, longitude, and height, as well as East, North and Up velocities, can be calculated from the XYZ positions and velocities reported in the BESTXYZ log, or logged separately by commanding BESTPOS and BESTVEL logs. A compatible set of commands needs to be issued to the rover's GNSS receiver in order to enable differential processing with the DGNSS data generated by these commands.

In the rover operating state 702, the CPU waits for a position/velocity/time ("PVT") report 720 from the GNSS receiver. Upon receiving a PVT report, it stores the information as required and updates its track of the base station platform position and velocity (721). It also generates a PVT report 722 for uplink transmission (this could be the same format, or a different format, than the PVT report received from the GNSS receiver). It is convenient to configure the GNSS receiver to generate PVT reports at the same rate as desired for uplink transmission of position and/or velocity messages—in this case, each PVT report received by the system control unit can be used to formulate an uplink message and the processing flow is essentially event-driven as illustrated in FIG. 7. However, with changes known to those skilled in the art, the rates could be dissimilar with the system control unit decimating or extrapolating as required. The CPU decides (723) whether it is time to shift to a reference station mode based on the time tag in the received PVT report. If it is time to switch, the CPU issues the necessary commands 724 on COM2 and switches to the reference station mode 703. For a NovAtel OEM4-G2L receiver, the CPU would issue the command FIX POSITION LAT LON HEIGHT, where LAT, LON and HEIGHT are the latitude, longitude, and height contained in the PVT message just received. Otherwise, it remains in the rover operating mode 702 awaiting the next PVT message.

In the reference station operating mode 703, the CPU first determines that the DGNSS uplink data needed for differential operation of the rover stations has been transmitted. This can be determined in various ways, such as, direct observation of the message being generated by the GNSS receiver on COM1 or a timer such that there is high confidence that the message is generated and transmitted even though the message is not directly observed. Once the DGNSS uplink data is transmitted, the CPU places the GNSS receiver back in a rover mode and then itself reverts to a rover operating state 702. In the case of a NovAtel OEM4-G2L receiver, the CPU would issue the command FIX NONE to force the GNSS receiver to enter a rover mode.

In one embodiment, the functions of the system control unit 303 are merged into the GNSS receiver 302, with embedded firmware to operate the GNSS receiver and deliver the necessary DGNSS data and navigation-domain data over an external interface to a datalink transmitter. In another embodiment, the functions of the system control unit 303 are merged into the GNSS receiver 302, and external commands are required to setup the appropriate data transfers, operating modes and operating cycles.

Figure 6B:
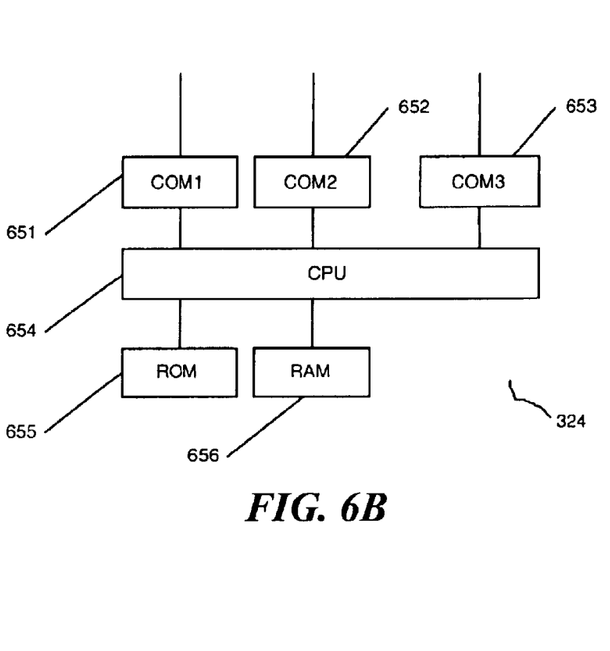

The auxiliary navigation unit 324 can be a single-board computer, laptop, or other data processing and routing device. Features are illustrated in FIG. 6B which shows an embodiment tailored to the overall system design illustrated previously in FIG. 3. Referring to FIG. 6B, auxiliary navigation unit 324 comprises three COM ports 651, 652, and 653 connected to a CPU 654, which operates in conjunction with a read-only memory 655 and a random-access memory 656. Other supporting circuitry is known to those skilled in the art, and is not shown in FIG. 6B. The COM1 port 651 provides an input interface for data received from the datalink receiver 322 over data interface 323. The COM2 port 652 provides unidirectional communications between the auxiliary navigation unit and the GNSS receiver 325 over data interface 327, typically for DGNSS data. The COM3 port 653 supports bidirectional data transfer with the GNSS receiver 325 over data interface 328, typically for GNSS receiver control, GNSS receiver status monitoring, reporting of GNSS observations, and reception of position and velocity estimates from the GNSS receiver (both differentially-corrected and non-differentially corrected). For some GNSS receivers, the functions of COM2 and COM3 can be merged into a single bidirectional interface. The ROM 655 provides for stored-program control, while the RAM 656 provides for real-time data storage.

Figure 8:
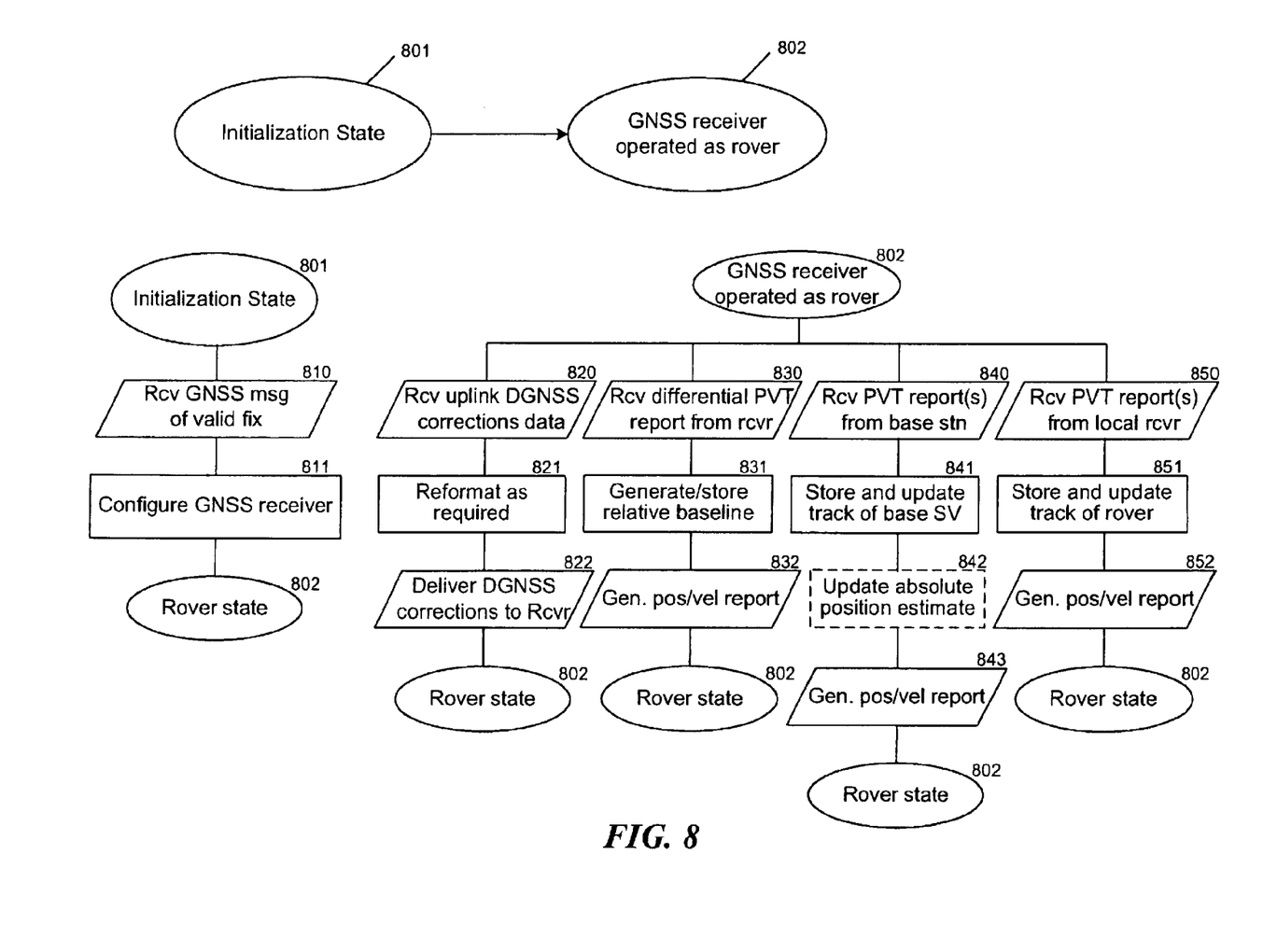
FIG. 8 illustrates a sequence of operating modes and operations associated with a DGNSS rover station.

The CPU 654 provides for the routing of data in support of DGNSS operations, control of the GNSS receiver, interface to external systems (e.g., other computers or displays), and the merging of observation-domain DGNSS processes with navigation-domain DGNSS processes. There are two primary operating states for the rover station as illustrated in FIG. 8 (mode control exercised by the CPU): initialization state and rover operating state. (There may also be a fault state which is not shown.) Upon power up, the CPU enters an initialization state 801 in which it waits for a valid message from the GNSS receiver indicating an initial position fix. This assumes that the GNSS receiver will generate a valid position fix of its own volition. If the GNSS receiver must be configured/commanded by the CPU in order to generate a first position fix, the process flow of FIG. 8 can be modified as required as one skilled in the art would appreciate. Upon receiving this message 810, the CPU issues the necessary commands 811 to the GNSS receiver to configure it for generating position, velocity, and time outputs at the desired rate. The rover station (CPU) then transitions to the rover operating state 802. For example, in the case of a NovAtel OEM4-G2L receiver, the CPU could issue commands such as:

INTERFACEMODE COM2 RTCA NONE
LOG PSRXYZ ONTIME 0.1
LOG MATCHEDXYZ ONCHANGED
LOG REFSTATION ONCHANGED

In conjunction with a base station commanded as described above and delivering DGNSS data, these commands setup the receiver to output position and velocity data at high rate, and a matched absolute position and reference station position data whenever it receives appropriate uplink DGNSS data (MATCHEDXYZ contains an absolute position calculated with reference to the reported reference station location, and MATCHEDXYZ-REFSTATION yields a relative baseline). There are other alternatives. For example, LOG RTKDATA ONCHANGED yields the relative baseline directly.

In the rover operating state 802, the CPU 654 waits for various messages on its input COM ports and performs processing in response to those messages. Upon receiving uplink DGNSS corrections data on COM1 port 651, originally generated by the base station, it reformats the message as required (reformatting may not be required) and transfers the data to the GNSS receiver via COM2 652, which is connected to data interface 327. These data will typically cause the GNSS receiver to generate an accurate relative baseline report, or differential position/ velocity/time (PVT) report, at a subsequent time (assuming the GNSS receiver is operating in a differential mode with the base station GNSS receiver acting as a reference station).

Upon receiving a differential PVT report from the GNSS receiver on COM3 653, the CPU either stores, or generates and stores as appropriate, the relative baseline between the base station and the rover. Depending on the design of the GNSS receiver and the messages generated, it may report the relative baseline directly, or it may report an absolute position which can be used to determine a relative baseline considering the latest-known absolute position of the base station. The CPU also generates a position and velocity report, either loading these data in memory for an auxiliary process (not shown), or forming a message for delivery to an external unit (communications interface not shown). The position and velocity report can comprise one or several data structures, or messages, and have many alternative formats, but for simplicity of description it may be considered a single message delivered to an external process with the data types listed in Table 2.

TABLE 2

Typical data content of position/velocity message generated by auxiliary navigation unit absolute position reported by base station, basis for determination, and timestamp
velocity reported by base station, basis for determination, and timestamp
relative baseline (rover minus base) as reported in last high-accuracy position fix (e.g., for NovAtel OEM4 this would be a MATCHEDPOS minus REFSTATION position determined from measurements taken at the same point in time), and timestamp
velocity of rover, basis for determination, and timestamp
relative position of rover, basis for determination
absolute prosition of rover, basis for determination Position may be lat/lon/alt (LLA) in a particular datum, or (x, y, z) in an ECEF coordinate frame. Velocity may be east/north/up velocity components or (x, y, z) velocity components. Timestamp may be time of applicability. Valid entries for basis for determination may depend on the data being described, but could include options such as SINGLE_POSITION, WMS_CORRECTED, CODE, DOPPLER, CODE_DIFFERENTIAL, L1_CARRIER, L1_L2, MATCHED, EXTRAPOLATED, and others. A general position/velocity message format can support reporting per 832, 843 and 852.

The base station absolute position and velocity data are updated 841 whenever the data 840 is either received in an uplink message or reported by the local GNSS receiver (i.e., the local GNSS receiver, if operating in a differential mode, may report the position of the base station). This data can be received in any one of several messages. The absolute position of the rover can be updated 842 whenever the absolute position of the base is received.

The rover station absolute position and velocity data are updated 851 whenever a velocity report 850 is received from the local GNSS receiver.

In one embodiment, the functions of the auxiliary navigation unit 324 are merged into the GNSS receiver 325, with embedded firmware to operate the GNSS receiver according to the present invention and calculate the relative baseline, as well as other data if desired, based on the GNSS observations and data received from the base station. In another embodiment, the functions of the auxiliary navigation unit 324 are merged into the GNSS receiver 325, and external commands are required to setup the appropriate data transfers, operating modes and operating cycles.

In one embodiment using a NovAtel OEM4 receiver or equivalent, the relative baseline high-accuracy position fix is intended to represent matched output log using carrier-phase measurements.

In one embodiment, the velocity of the rover is based on locally-observed GNSS Doppler or carrier-phase measurements and does not include any data associated with the base station. However, velocity can also be determined via code-phase measurements or an auxiliary sensor (IMU). Velocity measurements should be made at relatively high rate in order to achieve high accuracy, for example, 10 Hz or faster for ground vehicles or slowly accelerating aircraft.

The relative position of the rover, with respect to the base station, is updated whenever a matched-position report is received and whenever a velocity report is received from either the base station or the local GNSS receiver. A matched-position report causes an overwrite whereas a velocity report causes an accumulation of position offset by integrating the velocity report over the time interval since the previous velocity report (from the base station or rover, respectively).

The absolute position of the rover may be updated whenever the auxiliary navigation unit receives a SINGLE_POSITION report (or equivalent indicating non-differential operation), or a MATCHEDPOS report, or a local velocity report (updating by accumulation of a position offset as for the relative position report).

In addition to forming position and velocity reports, data structures storing historical data can be maintained.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for providing information for calculating a baseline between a moving base station and a moving rover station, the method comprising:
   collecting navigation-domain information indicating current position of the base station at navigation-domain times; and
   collecting observation-domain information indicating current position of the base station at observation-domain times
wherein the observation-domain times are less frequent than the navigation domain times.

2. The method of claim 1 including after collecting information, transmitting information derived from the collected information to the rover station.

3. The method of claim 1 wherein the times are at fixed intervals.

4. The method of claim 1 wherein the collecting of navigation-domain information includes setting a positioning receiver to operating in rover mode.

5. The method of claim 1 wherein the collecting of navigation-domain information includes setting a positioning receiver to provide navigation-domain information.

6. The method of claim 1 wherein the collecting of observation-domain information includes setting a positioning receiver to operating in reference mode.

7. The method of claim 1 wherein the collecting of observation-domain information includes setting a positioning receiver to provide observation-domain information.

8. The method of claim 1 wherein the collecting of navigation-domain information includes setting a positioning, receiver to provide navigation-domain information and the collecting of observation-domain information includes setting a positioning receiver to operating in reference mode.

9. The method of claim 8 wherein the positioning receiver is a GPS-based receiver.

10. A method for calculating relative position between a moving base station and a moving rover station, the method comprising:
    receiving navigation-domain information indicating current position of the base station at navigation-domain times;
    receiving observation-domain information indicating current position of the base station at observation-domain times;
    when observation-domain information is received, calculating a relative position of based on the received observation-domain information; and
    when navigation-domain information is received, calculating a relative position of based on a previously calculated relative position and the received navigation-domain information
wherein the observation-domain times are less frequent than the navigation domain times.

11. The method of claim 10 wherein the navigation-domain information and observation-domain information are received at the rover station from the base station.

12. The method of claim 10 wherein the times are at fixed intervals.

13. The method of claim 10 wherein the navigation-domain information is collected by setting a positioning receiver to operating in rover mode.

14. The method of claim 10 wherein the navigation-domain information is collected by setting a positioning receiver to provide navigation-domain information.

15. The method of claim 10 wherein the observation-domain information is collected by setting a positioning receiver to operating in reference mode.

16. The method of claim 10 wherein the observation-domain information is collected by setting a positioning receiver to provide observation-domain information.

17. The method of claim 10 wherein the navigation-domain information is collected by setting a positioning receiver to provide navigation-domain information and the observation-domain information is collected by setting a positioning receiver to operating in reference mode.

18. The method of claim 17 wherein the positioning receiver is a GPS-based receiver.

* * * * *